United States Patent [19]

Heider

[11] 4,360,556

[45] Nov. 23, 1982

[54] FOAMED LOW DENSITY POLYETHYLENE SHEET MATERIAL AND CARRIER

[75] Inventor: James E. Heider, Toledo, Ohio

[73] Assignee: Owens-Illinois, Inc., Toledo, Ohio

[21] Appl. No.: 295,990

[22] Filed: Aug. 25, 1981

Related U.S. Application Data

[63] Continuation of Ser. No. 134,009, Mar. 26, 1980, abandoned.

[51] Int. Cl.³ .................................................. B32B 3/10
[52] U.S. Cl. .................................... 428/131; 428/332; 428/339; 521/79; 521/143
[58] Field of Search ............... 206/432, 497, 523, 150, 206/158, 161; 428/131, 137, 332, 339; 521/79, 143

[56] References Cited

U.S. PATENT DOCUMENTS

| | | | |
|---|---|---|---|
| 2,819,231 | 1/1958 | Hahn et al. | 521/143 |
| 2,874,835 | 2/1959 | Poupitch | 206/150 |
| 3,399,098 | 8/1968 | Omoto et al. | 521/143 |
| 3,404,104 | 10/1968 | Hill | 521/143 |
| 3,461,087 | 8/1969 | Pritchard | 521/143 |
| 3,484,393 | 12/1969 | Ham | 521/79 |
| 3,773,100 | 11/1973 | Mawson et al. | 164/237 |
| 3,874,502 | 4/1975 | Weaver | 206/150 |
| 4,029,612 | 6/1977 | Collington | 521/79 |
| 4,055,695 | 10/1977 | Last et al. | 521/79 |
| 4,212,955 | 7/1980 | Tobias et al. | 206/432 |

*Primary Examiner*—William J. Van Balen
*Attorney, Agent, or Firm*—Charles S. Lynch; Myron E. Click; David H. Wilson

[57] ABSTRACT

A foamed low density polyethylyne sheet material is provided which finds utility in the fabrication of carriers for attachment to cylindrical containers. The sheet material is formed from a composition comprising low density polyethelyne polymer, a blowing agent mixture, and mineral oil, on commercially available extrusion equipment, and in proportions sufficient to obtain a 10-20 percent reduction in weight without a corresponding reduction of specific properties.

2 Claims, No Drawings

FOAMED LOW DENSITY POLYETHYLENE SHEET MATERIAL AND CARRIER

This is a continuation, of application Ser. No. 134,009 filed Mar. 26, 1980, now abandoned.

BACKGROUND OF THE INVENTION

This invention relates to a composition for use in the production of foamable sheet material, which sheet material may be fabricated into carriers, for attachment to cylindrical containers.

More specifically, the invention relates to a composition which provides a reduction in weight to the sheet material without a corresponding reduction in specific properties of the fabricated carrier.

Carriers used heretofore for attachment below the chimes of cylindrical containers have seen wide spread use by industry and have gained wide acceptance by the consuming public. The light weight character and durability of plastic carriers have provided numerous advantages over paper carriers. However, minimum thickness levels for unfoamed sheet material for fabrication into carriers and handability by machines is required, and the properties of the sheet material were more than necessary.

To overcome the problem of "wasting" properties and/or having to alter machinery to handle thinner sheet material, attempts have been made to moderately or heavily foam the sheet material. As anticipated, another problem arose regarding degradation of properties, such that the carriers produced were not suitable for use, especially with regard to tear propagation properties.

The lightly foamed sheet material of this invention has properties within the specifications required of unfoamed sheet material as a carrier for cylindrical containers. It is lighter in weight, it reduces raw material requirements and provides enhanced tear properties over unfoamed or moderate/heavily foamed sheet material.

One advantage then of the present invention is that a lighter weight sheet material is formed which is usable in the fabrication of carriers for cylindrical containers on existing equipment, without a corresponding loss in properties.

Another advantage of the present invention is the reduction in the amount of raw materials per sheet material or carrier produced.

Yet another advantage of the present invention is improved tear resistance and resistance to propagation of tears once commenced for the sheet material or carrier produced.

One feature of the present invention is the use of a blowing agent mixture to obtain the foamed, lighter weight sheet material when the composition is extruded on existing equipment.

Still another feature of the present invention is that scrap sheet material, obtained during fabrication of the carriers can be chopped and reused in the composition without adversely affecting the properties or performance of the carrier.

SUMMARY OF THE INVENTION

The present invention comprises a composition which provides a lightly foamed sheet material which yields approximately 10 to 20 percent reduction in density over unfoamed sheet material, without a corresponding percentage reduction in properties.

DESCRIPTION OF THE PREFERRED EMBODIMENT

The composition of this invention finds particular utility in the manufacture of sheet material, which is primarily used in the fabrication of carriers for cylindrical containers, of the type shown in U.S. Pat. Nos. 3,773,100 and 3,874,502. Such carriers are made from resilient, deformable, unsupported plastic sheet material, wherein a high percentage of the sheet material remains as scrap, during fabrication of the carriers and wherein the carriers are generally machine applied to containers thus requiring a fast response time between the stretching and the gripping of the carriers about the containers during production applications. Further, the carriers must possess requisite strength to prevent the containers from slipping or dropping from the carrier during handling by the manufacturer, distributors, retailers, and consumers.

These requirements indicate the necessity for any substitute composition to be usable on existing equipment, to keep the properties within specifications required for carriers and to allow scrap material to be reworked within the composition.

Therefore with a foamed structure, it becomes crucial that for a specific density reduction, of about 10–20 percent by weight, over an unfoamed structure, the properties are not proportionately reduced, but remain within established specifications, despite the fact that the foamed structure has cells distributed therein.

Carriers of the type described in the above-mentioned U.S. Patents must possess certain characteristics to be functional during processing, such as during machine application of carriers to containers, and during handling and shipping, when in combination with containers. Some of these characteristics include the properties of impact resistance, coefficient of friction, ductility, tear resistance, environmental stress cracking resistance, elastic modulus, yield stress, yield strain, ultimate strength and ultimate elongation.

The composition of ingredients used in the manufacture of sheet material employed for the fabrication of carriers, in the main, controls and/or establishes the desired balance of the above properties.

The processing equipment used in the manufacture of the sheet material, primarily the extrusion head and advancing rolls, presently have parameters which limit the thinness of the sheet material being produced.

It has been known for some time that the present equipment parameters and present composition parameters produce sheet material on carriers exhibiting properties in excess of actual requirements. This excess of properties per sheet material or carrier represents waste, which heretofore has been reluctantly accepted. Attempts to alter equipment parameters, eg. to reduce the thickness of the sheet material has been met with problems. Likewise, attempts to alter the composition have heretofore not been successful, as all of the properties would not be within specifications.

The present invention takes into account the parameters of the equipment and the difficulties in altering the ingredients of the composition, by introducing a blowing agent and mineral oil into the composition. A slightly foamed sheet material is produced at a thickness within equipment parameters and having properties within established specifications.

By slightly foaming the sheet material, not only is the structure lighter in weight, and a reduction in raw material requirements noted, but the properties of the foamed sheet material do not correspond on a percentage basis to the density reduction. In fact, it has been found, quite unexpectedly, that resistance to tears and to propagation of tears once commenced is markedly improved in the slightly foamed structure.

The slightly foamed structure provides a reduction in density of approximately 10–20 percent over an unfoamed structure of the same thermoplastic polymer. Preferably the density reduction in the slightly foamed structure is approximately 13–17 percent over an unfoamed structure. The density of the foamed structure of the present invention ranges from about 45 lb/ft$^3$ to about 55 lb/ft$^3$, and preferably ranges from about 48 lb/ft$^3$ to about 52 lb/ft$^3$.

The thickness of the structures, foamed and unfoamed are from about 0.014 to about 0.018 inches, the present day parameters of the equipment used to extrude and process the structures.

The slightly foamed structure of the present invention exhibits uniformly distributed or disbursed closed gas filled cells entrained within the structure. The gas filled cells are extremely small (of the order of magnitude of about 200 microns) diameter and they are barely visible with the naked eye. The surfaces of the foamed structure appear to be as smooth and uninterrupted as the unfoamed structure, thereby exhibiting similar aesthetic qualities of the latter, including resistance to soiling.

The tiny cells within the structure apparently disrupt the normal planes of tear in an unfoamed structure. Unfoamed structures, eg. of extruded polyethylene, exhibit oriented molecules and tearing normally occurs alongside these molecules. By slightly foaming a structure, the bubbles apparently cause disruptions along the planes of tear and thus alters the orientation of the molecules. This alteration apparently causes applied stress to the foamed structure to dissipate within the structure, thus enhancing resistance to tear.

The condition that the cells be closed and entrained within the structure is in addition to other conditions—the bubble size and the density of the bubbles. If the cell size or bubble size is allowed to grow and expand to the point of bursting, properties, especially resistance to tear are adversely affected. Likewise, if the density of the cells increases beyond about 100–500 cells/cm$^3$, the resistance to tear is adversely affected.

Generally, the cell size and density of the cells are a function of the amount and of the nature of the blowing agent or mixture of blowing agents employed within the composition. The temperature at which the blowing agents release an inert gas, such as nitrogen, is a controlling factor, thus the temperatures generated during extrusion must be tightly controlled. For a composition employing a blowing agent which releases an inert gas at about 325° F., the temperature range during extrusion must be controlled to about ±5° F.

The composition of the present invention which enables the production of slightly foamed sheet material for use in fabrication of carriers is represented as shown below.

EXAMPLE I

| Ingredients | Amount (pounds) |
|---|---|
| Low density thermoplastic polymer | 90–110 |
| Blowing agent mixture | 0.05–0.4 |
| Mineral oil | 0.05–0.2 |

EXAMPLE II

| Ingredients | Amount (pounds) |
|---|---|
| Low density thermoplastic polymer | 95–105 |
| Blowing agent mixture | 0.15–0.25 |
| Mineral Oil | 0.07–0.13 |

The low density thermoplastic polymer may be polyethylene and copolymers thereof or polypropylene and copolymers thereof. Generally, a low density polyethylene polymer having a number average molecular weight (Mn) of from about 22,000 to about 30,000 is preferred. Such polymers are commercially available from Union Carbide Corp. and U.S. Industrial Chemicals Corp.

The blowing agent mixture comprises blowing agents which release an inert gas at about 300° F.–400° F., such as azodicarb-onamides commercially available as "Kempore", and additives such as Metal Oxide as contained in commercially available in Kempore Mc.

The mineral oil may be any laboratory light grade oil commercially available from Standard Oil Co.

EXAMPLES III–V

| Ingredients | Amounts (pounds) | | |
|---|---|---|---|
| | III | IV | V |
| Low density polyethylene polymer | 100. | 100 | 100 |
| Blowing agent mixture | 0.2 | .25 | .15 |
| Mineral Oil | 0.1 | .13 | .07 |

The mixing procedure for the above examples comprises combining the polyethylene polymer, generally used in pellet form, and the mineral oil so that the latter coats the former. Thereafter the blowing agent mixture, generally used in powder form, is combined with the coated pellets to evenly distribute the ingredients of the mixture.

The mixtures of the above examples were fed to an extrusion machine previously used to produce unfoamed sheet, wherein the temperature range during extrusion was maintained within ±5° F. of the gasifying temperature of the blowing agent mixture. Foamed sheets were formed and carriers for containers were obtained therefrom, which were machine applied to cylindrical containers with favorable results. The densities of the resulting foamed sheets for Examples III, IV, V, were 50 lb/ft$^3$, 45 lb/ft$^3$, and 52 lb/ft$^3$ respectively.

During the fabrication of carriers from the sheet material much scrap is generated, i.e. about 75–80% scrap is generated. Because of this feature, the scrap must be reworked into the basic composition for the material to be feasible in industrial applications. Generally, the scrap is chopped, and is called "fluff" in the industry. This fluff is then added to the basic composition mixture and the mixture and the fluff are combined in a blender prior to being fed to an extrusion machine as described above.

It has been found that the chopped scrap sheet material can be present in the composition in an amount of from about 10.0 to about 90.0 percent by weight of the total weight of the thermoplastic polymer and the chopped scrap sheet material. Preferably, the chopped scrap sheet material is present in an amount of from about 60.0 to about 80.0 percent by weight of the total weight of the thermoplastic polymer and the chopped scrap sheet material. There appears to be no limitation on the number of times the scrap may be reworked into the composition.

The following examples represent compositions of this invention, employing chopped scrap sheet material, used in the production of slightly foamed structures.

EXAMPLE VI

| Ingredients | Amount (pounds) |
| --- | --- |
| Low Density Thermoplastic Polymer | 10–90 |
| Chopped Scrap Sheet Material | 10–90 |
| Blowing Agent Mixture | 0.02–0.4 |
| Mineral Oil | 0.01–0.2 |

EXAMPLE VII

| Ingredients | Amount (pounds) |
| --- | --- |
| Low Density Thermoplastic Polymer | 20–40 |
| Chopped Scrap Sheet Material | 60–80 |
| Blowing Agent Mixture | 0.05–0.15 |
| Mineral Oil | 0.02–0.07 |

EXAMPLES VIII–X

| Ingredients | Amount (pounds) | | |
| --- | --- | --- | --- |
| | VIII | IX | X |
| Low Density Thermoplastic Polymer | 30. | 40. | 20. |
| Chopped Scrap Sheet Material | 70. | 60. | 80. |
| Blowing Agent Mixture | 0.07 | .15 | .05 |
| Mineral Oil | 0.03 | .07 | .02 |

The mixing procedure for the above examples comprises combining the polyethylene polymer and the mineral oil, so that the mineral oil coats the polymer, usually in the form of pellets to assure that the subsequently combined blowing agent mixture is substantially uniformily applied to the oil coated pellets. The blowing agent mixture is generally employed in a powder or granular form, thereby requiring substantial mixing with the oil coated pellets. Subsequently, the mixture of polymer, oil, and blowing agent is combined with chopped scrap sheet material (fluff) for blending or mixing. Thereafter, the blended ingredients are fed to an extruder to produce a foamed structure. Carriers of the type hereinabove described and referred to were fabricated from the foamed structures, and the carriers were machine applied to cylindrical containers in a satisfactory manner. The properties of the foamed carriers were within the prescribed specifications of unfoamed carriers, and they matched the performance of unfoamed carriers produced from low density polyethylene polymer. However, the foamed carriers were found to have better resistance to tear and better resistance to propagation of tear once commenced. The densities of the resulting foamed structures for Examples VIII, IX, X were 50 lb/ft$^3$, 48 lb/ft$^3$, and 52 lb/ft$^3$ respectively. The scrap sheet material thus formed during fabrication of the foamed sheet of the above examples into carriers can again be chopped and reused.

Modifications of the disclosed compositions and sheet material produced therefrom may be resorted to without departing from the spirit and scope of the appended claims.

What I claim is:

1. A carrier for production application to a plurality of cylindrical containers to support said containers in predetermined spatial relationships with one another, said carrier comprising a resilient, ductile, sheet material having a thickness of from about 0.014 inch to 0.018 inch, and a plurality of aligned openings sized to receive said cylindrical containers in supported relationship with said carrier, characterized in that said sheet material is a foamed low density polyethylene polymer having a density of from about 45 to about 55 pounds per cubic foot and an increased resistance to tearing and to the propagation of tears, by comparison with a sheet of the same polyethylene polymer at the same thickness, but in an unfoamed condition.

2. The carrier as claimed in claim 1, wherein the sheet material comprises gas filled cells having a diameter of about 200 microns and the cell density of the sheet material is between about 100 and 500 cells per cubic centimeter.

* * * * *

UNITED STATES PATENT AND TRADEMARK OFFICE
CERTIFICATE OF CORRECTION

PATENT NO. : 4,360,556
DATED : November 23, 1982
INVENTOR(S) : James E. Heider

It is certified that error appears in the above—identified patent and that said Letters Patent are hereby corrected as shown below:

Col. 2, line 10, "3,773,100" should be --3,733,100--.

Signed and Sealed this

Fifteenth Day of February 1983

[SEAL]

Attest:

Attesting Officer

GERALD J. MOSSINGHOFF

Commissioner of Patents and Trademarks